US012791927B2

(12) United States Patent
Akiyama

(10) Patent No.: US 12,791,927 B2
(45) Date of Patent: Nov. 10, 2026

(54) ILLUMINATION DEVICE AND PROJECTOR

(71) Applicant: SEIKO EPSON CORPORATION, Tokyo (JP)

(72) Inventor: Koichi Akiyama, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 280 days.

(21) Appl. No.: 18/621,267

(22) Filed: Mar. 29, 2024

(65) Prior Publication Data

US 2024/0329508 A1 Oct. 3, 2024

(30) Foreign Application Priority Data

Mar. 31, 2023 (JP) ................................ 2023-057587

(51) Int. Cl.
*G03B 21/20* (2006.01)
*G03B 33/12* (2006.01)

(52) U.S. Cl.
CPC ..... *G03B 21/2066* (2013.01); *G03B 21/2013* (2013.01); *G03B 33/12* (2013.01)

(58) Field of Classification Search
CPC ........................... G03B 21/208; G03B 21/206; G03B 21/2066; G03B 21/2013; G02B 5/0215
See application file for complete search history.

(56) References Cited

U.S. PATENT DOCUMENTS 9,946,143 B1 * 4/2018 Akiyama ............ G03B 21/208
2017/0363943 A1 12/2017 Kurosaki
2019/0124305 A1 4/2019 Akiyama
2019/0243225 A1 8/2019 Akiyama
2020/0371417 A1 * 11/2020 Fan .................... G03B 21/2066
2020/0400863 A1 12/2020 Ikeda et al.
2022/0043330 A1 * 2/2022 Kawasumi ............ G03B 33/08

FOREIGN PATENT DOCUMENTS

JP 2015-145972 A 8/2015
JP 2015-152634 A 8/2015
JP 2017-227862 A 12/2017
JP 2018-054759 A 4/2018
JP 2018-072570 A 5/2018
JP 2019-061110 A 4/2019
JP 2019-078906 A 5/2019
JP 2019-138940 A 8/2019
KR 101216601 B1 * 12/2012 .............. G02B 5/02
WO WO 2019/163678 A 8/2019

* cited by examiner

*Primary Examiner* — Ryan D Howard
(74) *Attorney, Agent, or Firm* — Dority & Manning, P.A.

(57) ABSTRACT

An illumination device includes a first light source configured to emit first light, a second light source configured to emit second light, a light combining member configured to combine the first light and the second light with each other to emit illumination light, a rotary diffusion device having a substrate including a diffusing surface configured to diffusely reflect the illumination light, and a driver configured to rotate the substrate centering on a rotational axis, a condenser disposed between the light combining member and the rotary diffusion device, and configured to condense the illumination light toward the rotary diffusion device, and a collimator configured to collimate diffusion light of the illumination light. The diffusing surface of the substrate includes a first area where a first uneven structure is disposed, and a second area where a second uneven structure different from the first uneven structure is disposed.

10 Claims, 6 Drawing Sheets

ILLUMINATION DEVICE AND PROJECTOR

The present application is based on, and claims priority from JP Application Serial Number 2023-057587, filed Mar. 31, 2023, the disclosure of which is hereby incorporated by reference herein in its entirety.

BACKGROUND

1. Technical Field

The present disclosure relates to an illumination device and a projector.

2. Related Art

There is proposed a projector provided with an illumination device using a laser source as a light source wide in color gamut and high in efficiency with the view to an improvement in performance of the projector. In JP-A-2019-078906, there is disclosed an illumination device provided with a blue light source array, a red light source array, a green light source array, a color combining optical system, a condenser lens, and a diffuser plate. In this illumination device, by making the diffuser plate transmit the light emitted from the blue light source array, the red light source array, and the green light source array, the speckle noise in the projection image is prevented from occurring.

JP-A-2019-078906 is an example of the related art.

However, it is not sufficient for an effect of reducing the speckle noise only to use the diffuser plate of a transmissive type as in the illumination device described above, and therefore, a further improvement is desired.

SUMMARY

In view of the problems described above, according to an aspect of the present disclosure, there is provided an illumination device including a first light source configured to emit first light in a first wavelength band, a second light source configured to emit second light in a second wavelength band different from the first wavelength band, a light combining member configured to combine the first light and the second light with each other to emit illumination light, a rotary diffusion device having a substrate including a diffusing surface configured to diffusely reflect the illumination light emitted from the light combining member, and a driver configured to rotate the substrate centering on a rotational axis, a condenser disposed between the light combining member and the rotary diffusion device, and configured to condense the illumination light emitted from the light combining member toward the rotary diffusion device, and a collimator configured to collimate diffusion light of the illumination light emitted from the rotary diffusion device. The diffusing surface of the substrate includes a first area where a first uneven structure is disposed, and a second area where a second uneven structure different from the first uneven structure is disposed.

Further, according to another aspect of the present disclosure, there is provided a projector including the illumination device according to the aspect described above, a light modulator configured to modulate light emitted from the illumination device, and a projection optical device configured to project the light modulated by the light modulator.

DESCRIPTION OF EMBODIMENTS

Some embodiments of the present disclosure will hereinafter be described in detail with reference to the drawings. It should be noted that the drawings used in the following description show characteristic parts in an enlarged manner in some cases for the sake of convenience in order to make the features easy to understand, and the dimensional ratios between the constituents and so on are not necessarily the same as actual ones.

Some embodiments of the present disclosure will hereinafter be described.

First Embodiment

Figure 1:
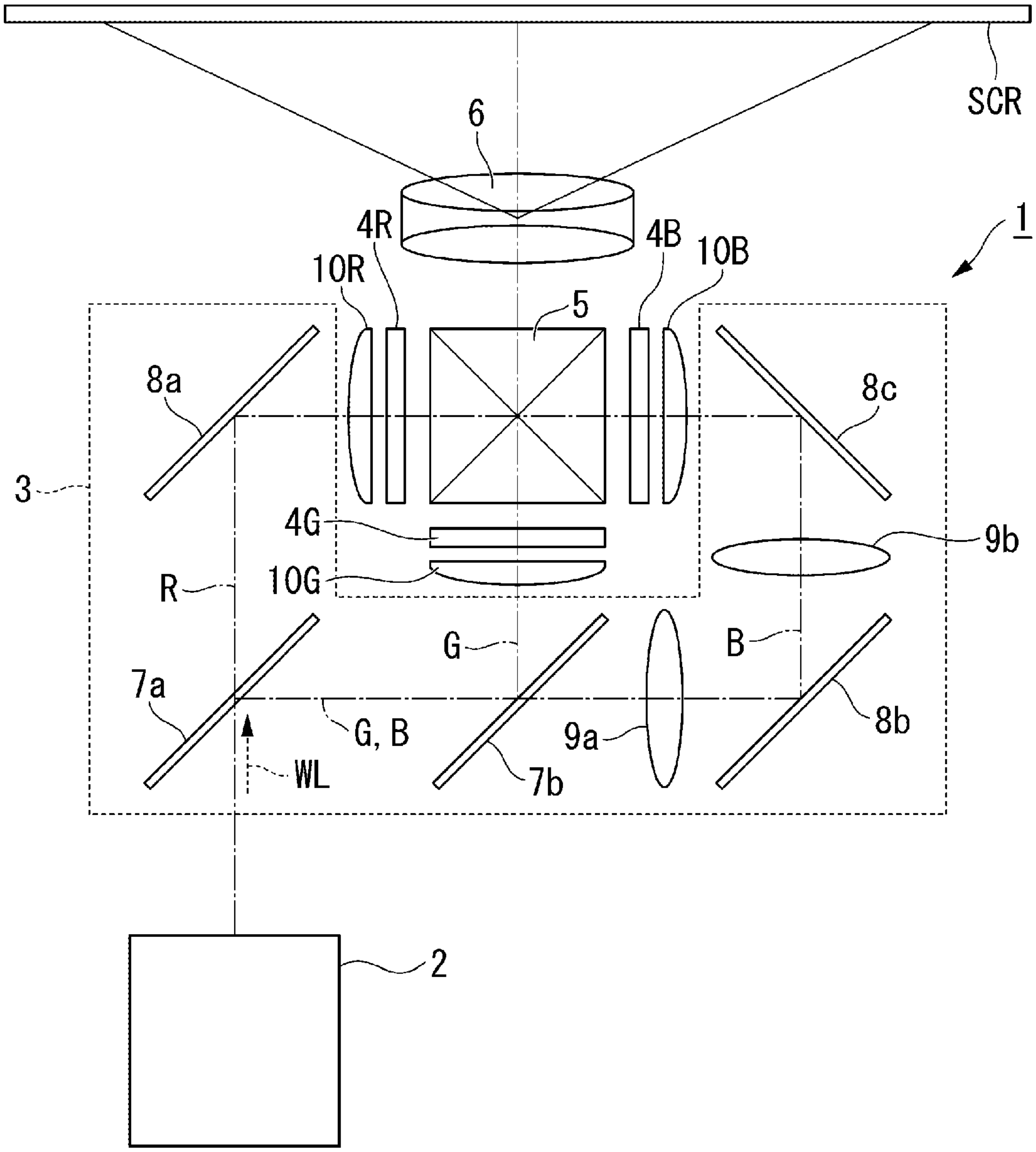
FIG. 1 is a schematic configuration diagram showing a projector according to a first embodiment.

FIG. 1 is a schematic configuration diagram showing a projector according to a first embodiment.

As shown in FIG. 1, a projector 1 according to the present embodiment is a projection-type image display device for displaying an image on a screen SCR. The projector 1 is provided with an illumination device 2, a color separation optical system 3, a light modulator 4R, a light modulator 4G, a light modulator 4B, a combining optical system 5, and a projection optical device 6.

The illumination device 2 emits illumination light WL having a white color toward the color separation optical system 3. The configuration of the illumination device 2 will be described later in detail.

The color separation optical system 3 separates illumination light WL into red illumination light R, green illumination light G, and blue illumination light B. The color separation optical system 3 is provided with a dichroic mirror 7*a* and a dichroic mirror 7*b*, a total reflection mirror 8*a*, a total reflection mirror 8*b*, and a total reflection mirror 8*c*, and a first relay lens 9*a* and a second relay lens 9*b*. A red color, a green color, a blue color are hereinafter collectively called RGB colors in some cases.

The dichroic mirror 7*a* separates the illumination light WL from the illumination device 2 into the red illumination light R and the other light (the green illumination light G and the blue illumination light B). The dichroic mirror 7*a* transmits the red illumination light R, and at the same time, reflects the other light. The dichroic mirror 7*b* reflects the green illumination light G, and at the same time, transmits the blue illumination light B.

The total reflection mirror 8*a* reflects the red illumination light R toward the light modulator 4R. The total reflection mirror 8*b* and the total reflection mirror 8*c* guide the blue illumination light B to the light modulator 4B. The green illumination light G is reflected from the dichroic mirror 7*b* toward the light modulator 4G.

The first relay lens 9*a* and the second relay lens 9*b* are arranged in a posterior stage of the dichroic mirror 7*b* in the light path of the blue illumination light B.

The light modulator 4R modulates the red illumination light R in accordance with image information to form red image light. The light modulator 4G modulates the green illumination light G in accordance with the image information to form green image light. The light modulator 4B modulates the blue illumination light B in accordance with the image information to form blue image light.

In the light modulator 4R, the light modulator 4G, and the light modulator 4B, there are used, for example, transmissive liquid crystal panels. Further, at the incident side and the exit side of each of the liquid crystal panels, there are respectively arranged polarization plates (not shown).

Further, at the incident side of the light modulator 4R, the light modulator 4G, and the light modulator 4B, there are arranged a field lens 10R, a field lens 10G, and a field lens 10B, respectively.

The image light from each of the light modulator 4R, the light modulator 4G, and the light modulator 4B enters the combining optical system 5. The combining optical system 5 combines the image light, and then emits the image light thus combined toward the projection optical device 6. In the combining optical system 5, there is used, for example, a cross dichroic prism.

The projection optical device 6 is configured with a projection lens group, and projects the image light combined by the combining optical system 5 toward the screen SCR in an enlarged manner. Thus, the color image enlarged is displayed on the screen SCR.

Figure 2:
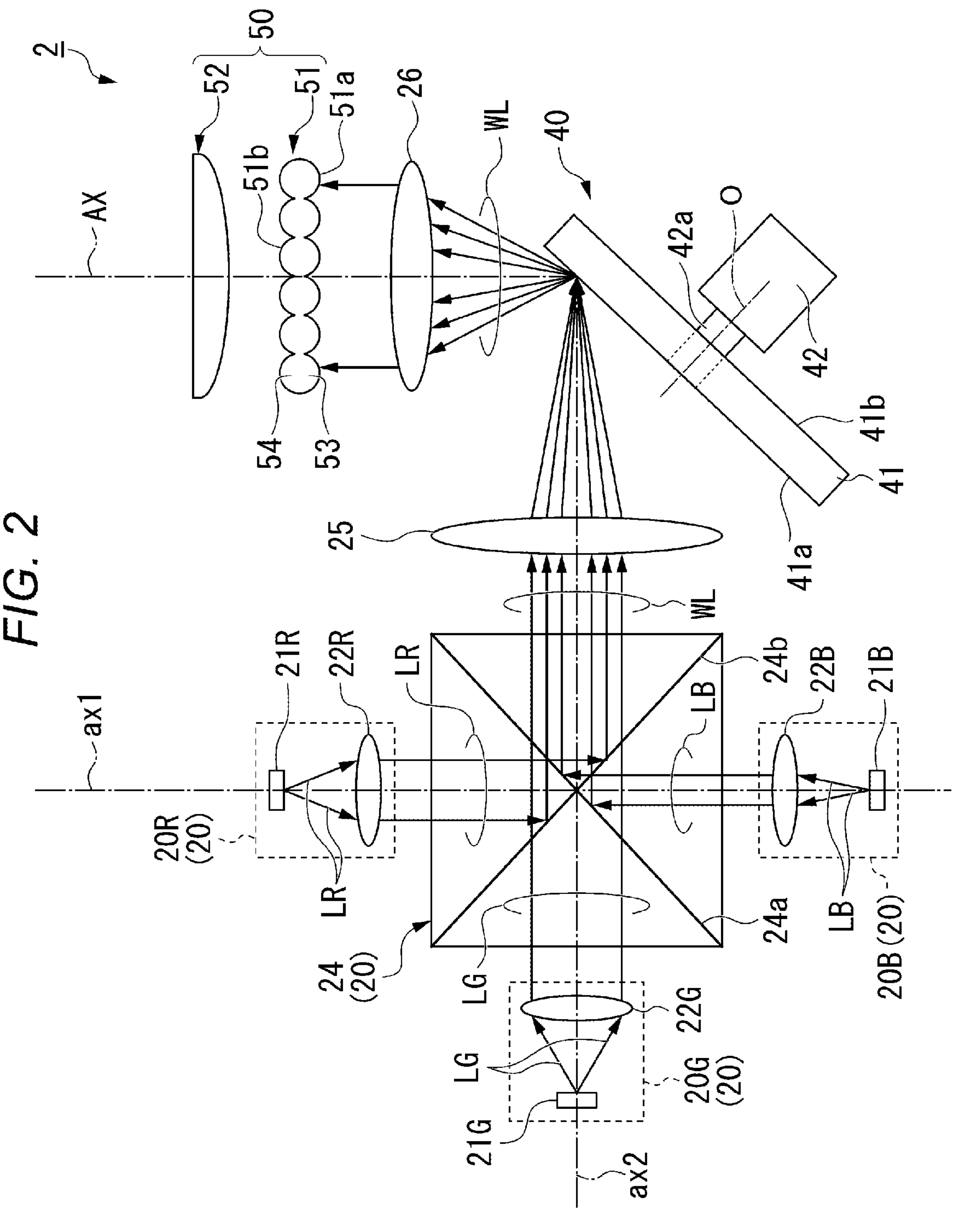
FIG. 2 is a diagram showing a schematic configuration of an illumination device.

Then, the illumination device 2 in the embodiment of the present disclosure will be described. FIG. 2 is a diagram showing a schematic configuration of the illumination device 2.

As shown in FIG. 2, the illumination device 2 is provided with a light source device 20, a condenser 25, a rotary diffusion device (a rotating body device) 40, a collimator 26, and an integrator optical system 50.

The light source device 20 includes a red-color light source (a first light source) 20R, a green-color light source (a second light source) 20G, a blue-color light source (a third light source) 20B, and a light combining member 24.

In the present embodiment, the red-color light source 20R, and light combining member 24, and the blue-color light source 20B are disposed on an optical axis ax1 of the red-color light source 20R. The green-color light source 20G, the light combining member 24, and the rotary diffusion device 40 are disposed on an optical axis ax2 of the green-color light source 20G. The optical axis ax1 and the optical axis ax2 perpendicular to each other. It should be noted that an optical axis of the blue-color light source 20B coincides with the optical axis ax1 of the red-color light source 20R.

Further, the rotary diffusion device 40, the collimator 26, and the integrator optical system 50 are disposed on an illumination light axis AX of the illumination device 2. The illumination light axis AX and the optical axis ax1 are parallel to each other.

The red-color light source 20R has a red laser element 21R and a collimator lens 22R. The green-color light source 20G has a green laser element 21G and a collimator lens 22G. The blue-color light source 20B has a blue laser element 21B and a collimator lens 22B. In the present embodiment, the light source device 20 has the red laser element 21R, the green laser element 21G, and the blue laser element 21B as light sources for emitting the light.

The red laser element 21R emits red light (first light) LR in a red wavelength band (a first wavelength band) having a wavelength band of, for example, 585 nm through 720 nm. The collimator lens 22R converts the red light LR emitted from the red laser element 21R into parallel light.

The green laser element 21G emits green light (second light) LG in a green wavelength band (a second wavelength band) having a wavelength band of, for example, 495 nm through 585 nm. The collimator lens 22G converts the green light LG emitted from the green laser element 21G into parallel light.

The blue laser element 21B emits blue light (third light) LB in a blue wavelength band (a third wavelength band) having a wavelength band of, for example, 380 nm through 495 nm. The collimator lens 22B converts the blue light LB emitted from the blue laser element 21B into parallel light.

It should be noted that in FIG. 2, there are shown a single laser source and a single collimator lens as each of the light sources 20R, 20G, and 20B, but the number and the arrangement of the laser sources and collimator lenses are not limited. Further, it is possible for each of the light sources 20R, 20G, and 20B to have other members such as a package for holding the laser sources and collimator lenses.

The light combining member 24 is formed of a cross dichroic prism. The cross dichroic prism has a first dichroic mirror 24*a* and a second dichroic mirror 24*b*. The first dichroic mirror 24*a* and the second dichroic mirror 24*b* are each arranged so as to cross each of the optical axis ax1 and the optical axis ax2 at 45°. Further, the first dichroic mirror 24*a* and the second dichroic mirror 24*b* cross each other so as to form an angle of 45°.

The first dichroic mirror 24*a* has optical characteristics of reflecting the blue light LB, and transmitting the green light LG and the red light LR. The second dichroic mirror 24*b* has optical characteristics of reflecting the red light LR, and transmitting the blue light LB and the green light LG. In such a manner, the light combining member 24 combines the red light LR, the green light LG, and the blue light LB with each other to generate the illumination light WL having the white color.

The condenser 25 is disposed the light combining member 24 and the rotary diffusion device 40, and condenses the illumination light WL emitted from the light combining member 24, toward the rotary diffusion device 40. The rotary diffusion device 40 is disposed at the exit side of the condenser 25. The rotary diffusion device 40 has a substrate 41 capable of rotating centering on a predetermined rotational axis O, and a driver 42 formed of a motor. The substrate 41 includes a diffusing surface 41*a* for diffusely reflecting the illumination light WL emitted from the light combining member 24, and a reverse surface 41*b* at an opposite side to the diffusing surface 41*a*. The substrate 41 is attached to a rotational axis part 42*a* of the driver 42 which rotates centering on the rotational axis O. In other words, the rotary diffusion device 40 in the present embodiment is a reflective-type diffusion device.

The rotary diffusion device 40 is disposed so that the diffusing surface 41*a* of the substrate 41 crosses the optical axis ax2 and the illumination light axis AX at an angle of 45°. The rotary diffusion device 40 is disposed in the vicinity of a condensing position or a focusing position of the condenser 25. The rotary diffusion device 40 diffuses the illumination light WL as described later to thereby prevent the speckle, which degrades the display quality, from occurring.

Figure 3:
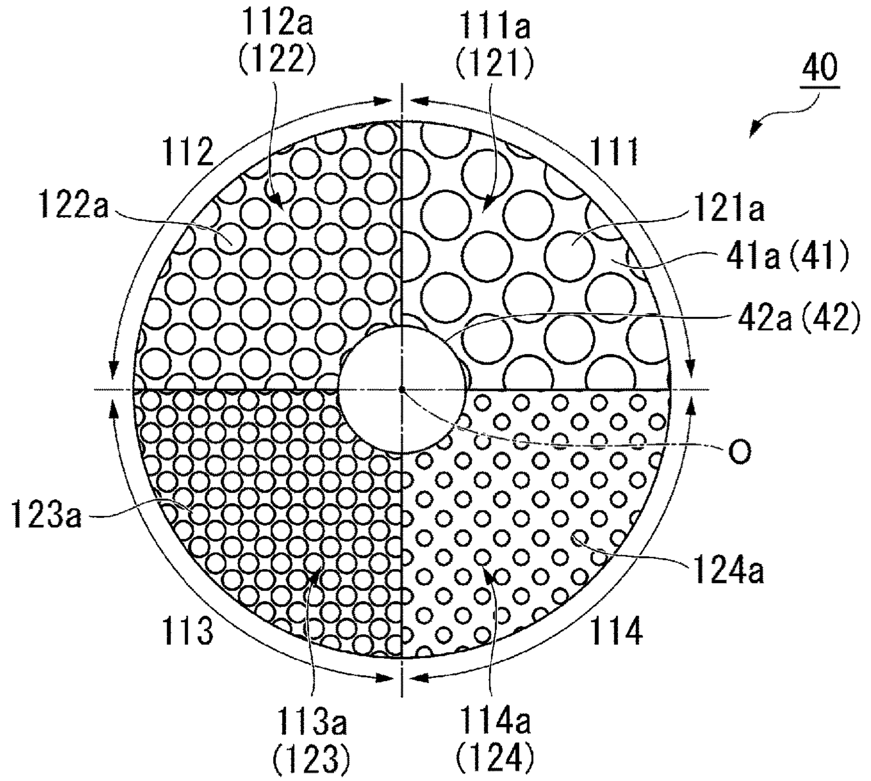
FIG. 3 is a plan view showing a configuration of a related part of a rotary diffusion device.

FIG. 3 is a plan view showing a configuration of a related part of the rotary diffusion device 40. FIG. 3 is a diagram as a plan view of the substrate 41 of the rotary diffusion device 40 from a direction along the rotational axis O.

As shown in FIG. 3, the diffusing surface 41*a* of the substrate 41 includes a first area 111, a second area 112, a third area 113, and a fourth area 114. The first area 111 is an area where a first uneven structure 111*a* is provided. The second area 112 is an area where a second uneven structure 112*a* different from the first uneven structure 111*a* is provided. The third area 113 is an area where a third uneven structure 113*a* different from the first uneven structure 111*a* and the second uneven structure 112*a* is provided. The fourth area 114 is an area where a fourth uneven structure 114*a* different from the first uneven structure 111*a*, the second uneven structure 112*a*, and the third uneven structure 113*a* is provided. It should be noted that when the substrate 41 is formed of a light-transmissive material such as glass or plastic, the diffusing surface 41*a* has light reflectivity by forming a reflective coat of a surface of each of the uneven structures 111*a*, 112*a*, 113*a*, and 114*a*. In contrast, when the substrate 41 is formed of a material such as metal having light reflectivity, it is not required to form the reflective coat on the surface of each of the uneven structures 111*a*, 112*a*, 113*a*, and 114*a*, but it is possible to form the reflective coat to thereby enhance the light reflectivity of the diffusing surface 41*a*.

The first area 111, the second area 112, the third area 113, and the fourth area 114 are arranged side by side in a circumferential direction in the diffusing surface 41*a* of the substrate 41 formed of a circular shape. The first area 111, the second area 112, the third area 113, and the fourth area 114 are the same in size as each other, and have sizes of a portion obtained by dividing the diffusing surface 41*a* having the circular shape into four equal portions in the circumferential direction.

The first uneven structure 111*a* is formed of a first lens array surface 121 including a plurality of first small lens surfaces 121*a*. On the first lens array surface 121, the plurality of first small lens surfaces 121*a* is the same in pitch and curvature radius as each other. In other words, the first uneven structure 111*a* has a homogenous uneven pattern.

The second uneven structure 112*a* is formed of a second lens array surface 122 including a plurality of second small lens surfaces 122*a*. On the second lens array surface 122, the plurality of second small lens surfaces 122*a* is the same in pitch and curvature radius as each other. In other words, the second uneven structure 112*a* has a homogenous uneven pattern.

The first small lens surfaces 121*a* and the second small lens surfaces 122*a* are different in at least one of pitch and curvature radius from each other. In the case of the present embodiment, the first small lens surfaces 121*a* and the second small lens surfaces 122*a* are different in both of pitch and curvature radius from each other.

The third uneven structure 113*a* is formed of a third lens array surface 123 including a plurality of third small lens surfaces 123*a*. On the third lens array surface 123, the plurality of third small lens surfaces 123*a* is the same in pitch and curvature radius as each other. In other words, the third uneven structure 113*a* has a homogenous uneven pattern.

The fourth uneven structure 114*a* is formed of a fourth lens array surface 124 including a plurality of fourth small lens surfaces 124*a*. On the fourth lens array surface 124, the plurality of fourth small lens surfaces 124*a* is the same in pitch and curvature radius as each other. In other words, the fourth uneven structure 114*a* has a homogenous uneven pattern.

The third small lens surfaces 123*a* and the fourth small lens surfaces 124*a* are different in at least one of pitch and curvature radius from each other. In the case of the present embodiment, the third small lens surfaces 123*a* and the fourth small lens surfaces 124*a* are different in both of pitch and curvature radius from each other. Further, the pitch and the curvature radius of the third small lens surfaces 123*a* and the fourth small lens surfaces 124*a* are different from the pitch and the curvature radius of the first small lens surfaces 121*a* and the second small lens surfaces 122*a*.

In other words, in the present embodiment, the first small lens surfaces 121*a*, the second small lens surfaces 122*a*, the third small lens surfaces 123*a*, and the fourth small lens surfaces 124*a* are different in pitch and curvature radius from each other. In other words, the uneven structures 111*a*, 112*a*, 113*a*, and 114*a* have the homogenous uneven patterns, wherein the uneven patterns are different from each other.

In the rotary diffusion device 40 in the present embodiment, by the substrate 41 rotating centering on the rotational axis O, the illumination light WL enters the areas 111, 112, 113, and 114 of the diffusing surface 41*a* in a time-sequential manner. Therefore, the rotary diffusion device 40 emits diffusion light of the illumination light WL from the areas 111, 112, 113, and 114 in a time-sequential manner.

In the rotary diffusion device 40 in the present embodiment, the areas 111, 112, 113, and 114 of the diffusing surface 41*a* each emit the diffusion light of the illumination light WL. Here, when taking each of the areas 111, 112, 113, and 114 as a simple body, since the areas 111, 112, 113, and 114 all have the homogenous uneven patterns, the diffusion light of the illumination light WL emitted from each of the areas 111, 112, 113, and 114 includes a diffraction pattern.

In the case of the present embodiment, since the areas 111, 112, 113, and 114 are different in uneven pattern from each other, the diffraction patterns included in the illumination light WL respectively emitted from the areas 111, 112, 113, and 114 are also different from each other.

Based on such a configuration, it is possible for the rotary diffusion device 40 in the present embodiment to emit the illumination light WL including the diffraction patterns different from each other from the respective areas 111, 112, 113, and 114 in a time-sequential manner as the diffusion light by the substrate 41 rotating centering on the rotational axis O. Therefore, the speckle pattern of the illumination light WL temporally changes. Thus, since the speckle pattern of the illumination light WL is temporally averaged, it is possible to reduce the speckle noise of the projection image including the illumination light WL.

Going back to FIG. 2, the collimator 26 is formed of a collimator lens. The collimator 26 collimates the diffusion light of the illumination light WL emitted from the rotary diffusion device 40, and then emits the result toward the integrator optical system 50. In the case of the present embodiment, the collimator 26 is formed of a single convex lens. It should be noted that the collimator 26 may be formed of a plurality of lenses.

The integrator optical system 50 has a multi-lens array 51 and a superimposing lens 52. The integrator optical system 50 homogenizes the illuminance distribution of the illumination light WL emitted from the collimator 26 in the image forming area of each of the light modulators 4R, 4G, and 4B.

In the case of the present embodiment, the multi-lens array 51 is formed of a double-sided multi-lens array obtained by integrating a first multi-lens surface 51*a* and a second multi-lens surface 51*b* with each other. The first multi-lens surface 51*a* includes a plurality of first small lenses 53 for dividing the illumination light WL emitted from the collimator 26 into a plurality of partial light beams. The plurality of first small lenses 53 are disposed in a matrix in a plane perpendicular to the illumination light axis AX.

The second multi-lens surface 51*b* has a plurality of second small lenses 54 corresponding respectively to the first small lenses 53 of the first multi-lens surface 51*a*. The second multi-lens surface 51*b* forms an image of each of the first small lenses 53 of the first multi-lens surface 51*a* in the image forming area of each of the light modulator 4R, the light modulator 4G, and the light modulator 4B, or in the vicinity of the image formation area of each of the light modulator 4R, the light modulator 4G, and the light modulator 4B. The plurality of second small lenses 54 are arranged in a matrix in a plane perpendicular to the illumination light axis AX.

The superimposing lens 52 condenses each of the partial light beams emitted from the multi-lens array 51 to superimpose the partial light beams thus condensed in the image forming area of each of the light modulator 4R, the light modulator 4G, and the light modulator 4B, or in the vicinity of the image forming area of each of the light modulator 4R, the light modulator 4G, and the light modulator 4B.

As described above, the illumination device 2 according to the present embodiment is provided with the red-color light source 20R for emitting the red light LR in the red wavelength band, the green-color light source 20G for emitting the green light LG in the green wavelength band, the blue-color light source 20B for emitting the blue light LB in the blue wavelength band, the light combining member 24 which combines the red light LR, the green light LG, and the blue light LB with each other to emit the result, the rotary diffusion device 40 having the substrate 41 including the diffusing surface 41*a* for diffusely reflecting the illumination light WL emitted from the light combining member 24, and the driver 42 for rotating the substrate 41 centering on the rotational axis O, the condenser 25 which is disposed between the light combining member 24 and the rotary diffusion device 40, and condenses the illumination light WL emitted from the light combining member 24, toward the rotary diffusion device 40, and the collimator 26 for collimating the illumination light WL as the diffusion light emitted from the rotary diffusion device 40. The diffusing surface 41*a* of the substrate 41 includes the first area 111 where the first uneven structure 111*a* is disposed, and the second area 112 where the second uneven structure 112*a* different from the first uneven structure 111*a* is disposed.

Further, in the case of the illumination device 2 in the present embodiment, the first uneven structure 111*a* is formed of the first lens array surface 121 including the plurality of first small lens surfaces 121*a* the same in pitch and curvature radius as each other, the second uneven structure 112*a* is formed of the second lens array surface 122 including the plurality of second small lens surfaces 122*a* the same in pitch and curvature radius as each other, and the pitch of the first small lens surfaces 121*a* and the pitch of the second small lens surfaces 122*a* are different from each other, and the curvature radius of the first small lens surfaces 121*a* and the curvature radius of the second small lens surfaces 122*a* are different from each other.

According to the illumination device 2 related to the present embodiment, it is possible to emit the illumination light WL including diffraction patterns different from each other from the first area 111 and the second area 112 of the diffusing surface 41*a* of the substrate 41 of the rotary diffusion device 40. Thus, since the speckle pattern of the illumination light WL temporally changes, the speckle pattern of the illumination light WL is temporally averaged, and thus, it is possible to reduce the speckle noise due to the illumination light WL.

The projector 1 according to the present embodiment is provided with the illumination device 2, the light modulators 4R, 4G, and 4B for modulating the illumination light WL emitted from the illumination device 2, and the projection optical device 6 for projecting the light modulated by the light modulators 4R, 4G, and 4B.

According to the projector 1 related to the present embodiment, since there is provided the illumination device 2 for emitting the illumination light WL reduced in speckle noise, it is possible to provide the projector which displays an image reduced in speckle noise and good in quality.

Second Embodiment

Then, a second embodiment of the present disclosure will be described. The present embodiment and the first embodiment are different in configuration of the diffusing surface of the rotary diffusion device, and the rest of the configuration is common to the present embodiment and the first embodiment. Therefore, the configuration of the diffusing surface of the rotary diffusion device will hereinafter be described, and the description of the rest of the configuration will be omitted. Further, the members and the elements common to the first embodiment will be denoted by the same reference symbols, and the description of the details will be omitted.

Figure 4:
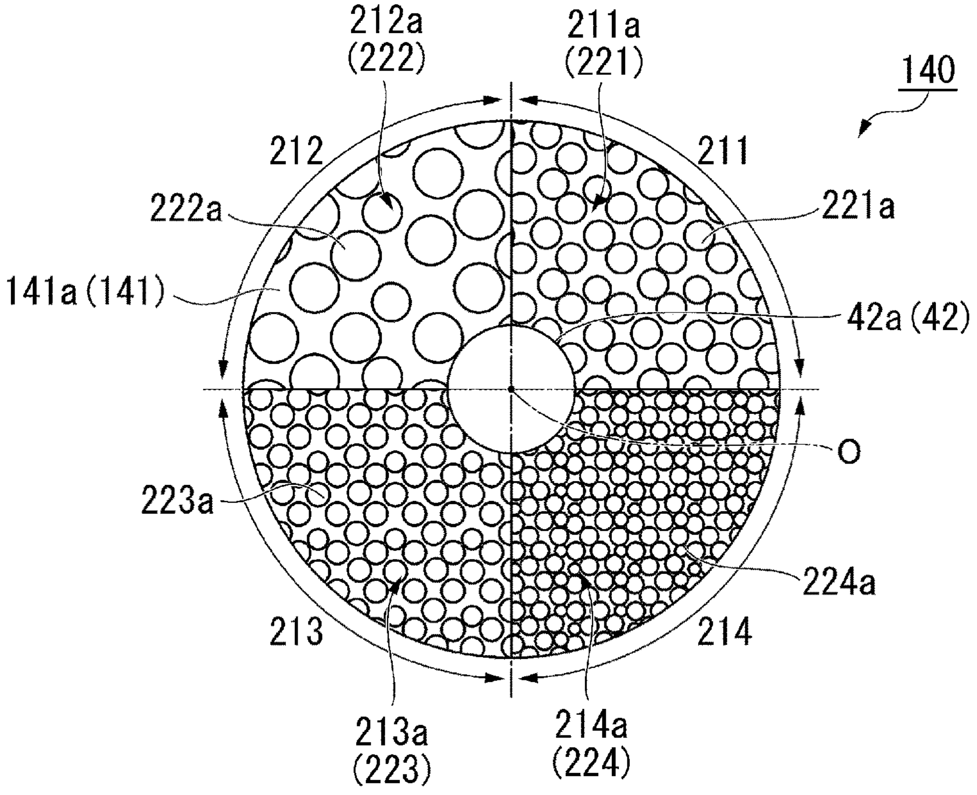
FIG. 4 is a plan view showing a configuration of a related part of a rotary diffusion device in a second embodiment.

FIG. 4 is a plan view showing a configuration of a related part of a rotary diffusion device 140 in the present embodiment. FIG. 4 is a diagram as a plan view of a substrate 141 of the rotary diffusion device 140 from the direction along the rotational axis O.

As shown in FIG. 4, in the rotary diffusion device 140 in the present embodiment, a diffusing surface 141*a* of the substrate 141 includes a first area 211 where a first uneven structure 211*a* is disposed, a second area 212 where a second uneven structure 212*a* is disposed, a third area 213 where a third uneven structure 213*a* is disposed, and a fourth area 214 where a fourth uneven structure 214*a* is disposed.

In the present embodiment, the first uneven structure 211*a* is formed of a first lens array surface 221 including a plurality of first small lens surfaces 221*a*. The first lens array surface 221 is a surface having a random nature in which the first small lens surfaces 221*a* are made different in at least one of pitch and curvature radius from each other. In other words, the first lens array surface 221 is formed of an uneven pattern in which concave portions and convex portions are irregularly arranged.

The second uneven structure 212*a* is formed of a second lens array surface 222 including a plurality of second small lens surfaces 222*a*. The second lens array surface 222 is a surface having a random nature in which the second small lens surfaces 222*a* are made different in at least one of pitch and curvature radius from each other. In other words, the second lens array surface 222 is formed of an uneven pattern in which concave portions and convex portions are irregularly arranged.

In the present embodiment, the first small lens surfaces 221*a* of the first lens array surface 221 and the second small lens surfaces 222*a* of the second lens array surface 222 are different in at least one of pitch and curvature radius from each other. In other words, the second lens array surface 222 and the first lens array 221 are different in random nature from each other.

The third uneven structure 213*a* is formed of a third lens array surface 223 including a plurality of third small lens surfaces 223*a*. The third lens array surface 223 is a surface having a random nature in which the third small lens surfaces 223*a* are made different in at least one of pitch and curvature radius from each other. In other words, the third lens array surface 223 is formed of an uneven pattern in which concave portions and convex portions are irregularly arranged.

The fourth uneven structure 214*a* is formed of a fourth lens array surface 224 including a plurality of fourth small lens surfaces 224*a*. The fourth lens array surface 224 is a surface having a random nature in which the fourth small lens surfaces 224*a* are made different in at least one of pitch and curvature radius from each other. In other words, the fourth lens array surface 224 is formed of an uneven pattern in which concave portions and convex portions are irregularly arranged.

In the present embodiment, the third small lens surfaces 223*a* of the third lens array surface 223 and the fourth small lens surfaces 224*a* of the fourth lens array surface 224 are different in at least one of pitch and curvature radius from each other. Further, the first small lens surfaces 221*a*, the second small lens surfaces 222*a*, the third small lens surfaces 223*a*, and the fourth small lens surfaces 224*a* are different in at least one of pitch and curvature radius from each other.

In other words, in the present embodiment, the uneven structures 211*a*, 212*a*, 213*a*, and 214*a* are respectively formed of the uneven patterns different in random nature from each other.

By the substrate 141 rotating centering on the rotational axis O, the rotary diffusion device 140 in the present embodiment emits the diffusion light of the illumination light WL from each of the areas 211, 212, 213, and 214 in a time-sequential manner.

In the case of the present embodiment, since the areas 211, 212, 213, and 214 are respectively provided with the uneven structures 211*a*, 212*a*, 213*a*, and 214*a* formed of the uneven patterns different in random nature from each other, the speckle pattern of the illumination light WL emitted from the areas 211, 212, 213, and 214 temporally changes.

As described above, according to the rotary diffusion device 140 in the present embodiment, it is possible to emit the illumination light WL including the speckle patterns different from each other respectively from the first area 211, the second area 212, the third area 213, and the fourth area 214 of the diffusing surface 141*a* of the substrate 141. Thus, the speckle pattern of the illumination light WL is temporally averaged, and it is possible to reduce the speckle noise due to the illumination light WL.

Therefore, according to the illumination device using the rotary diffusion device 140 related to the present embodiment, and the projector using this illumination device, it is possible to display an image reduced in speckle noise and good in quality.

Third Embodiment

Then, a third embodiment of the present disclosure will be described. The present embodiment and the first embodiment are different in configuration of the diffusing surface of the rotary diffusion device, and the rest of the configuration is common to the present embodiment and the first embodiment. Therefore, the configuration of the diffusing surface of the rotary diffusion device will hereinafter be described, and the description of the rest of the configuration will be omitted. Further, the members and the elements common to the first embodiment will be denoted by the same reference symbols, and the description of the details will be omitted.

Figure 5:
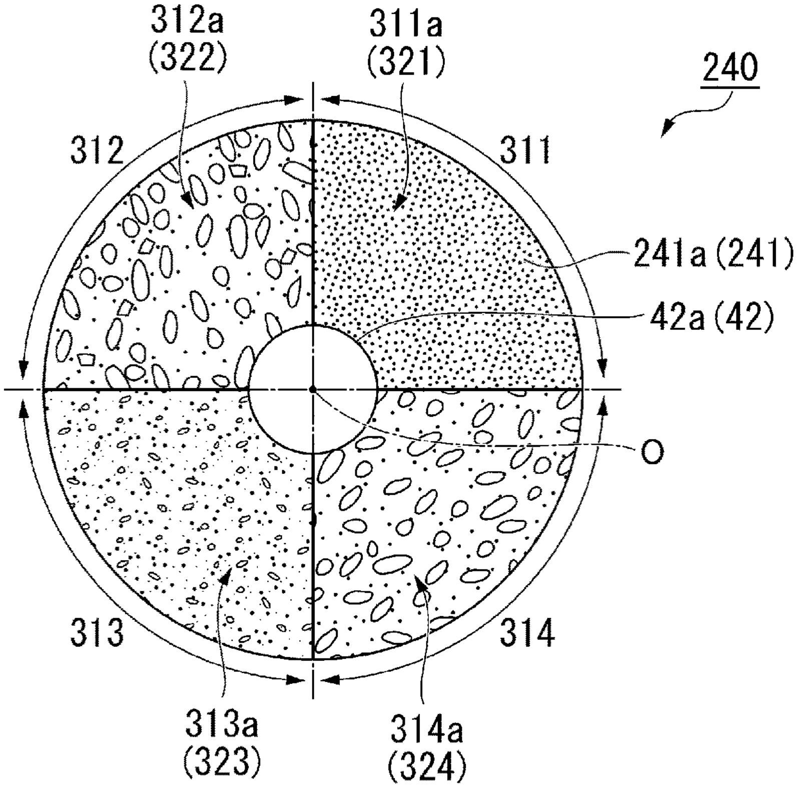
FIG. 5 is a plan view showing a configuration of a related part of a rotary diffusion device in a third embodiment.

FIG. 5 is a plan view showing a configuration of a related part of a rotary diffusion device 240 in the present embodiment. FIG. 5 is a diagram as a plan view of a substrate 241 of the rotary diffusion device 240 from the direction along the rotational axis O.

As shown in FIG. 5, in the rotary diffusion device 240 in the present embodiment, a diffusing surface 241*a* of the substrate 241 includes a first area 311 where a first uneven structure 311*a* is disposed, a second area 312 where a second uneven structure 312*a* is disposed, a third area 313 where a third uneven structure 313*a* is disposed, and a fourth area 314 where a fourth uneven structure 314*a* is disposed.

The first uneven structure 311*a* is formed of a first uneven surface 321 formed of an uneven pattern having a random nature. The first uneven surface 321 is formed using, for example, an etching process or a blast process, and has a random pattern with concave portions and convex portions arranged irregularly.

The second uneven structure 312*a* is formed of a second uneven surface 322 formed of an uneven pattern having a random nature. The second uneven surface 322 is formed using, for example, an etching process or a blast process, and has a random pattern with concave portions and convex portions arranged irregularly.

The third uneven structure 313*a* is formed of a third uneven surface 323 formed of an uneven pattern having a random nature. The third uneven surface 323 is formed using, for example, an etching process or a blast process, and has a random pattern with concave portions and convex portions arranged irregularly.

The fourth uneven structure 314*a* is formed of a fourth uneven surface 324 formed of an uneven pattern having a random nature. The fourth uneven surface 324 is formed using, for example, an etching process or a blast process, and has a random pattern with concave portions and convex portions arranged irregularly.

In the present embodiment, the first uneven surface 321, the second uneven surface 322, the third uneven surface 323, and the fourth uneven surface 324 are respectively formed of the uneven patterns different in random nature from each other. It should be noted that the random nature of each of the uneven surfaces is controlled by arbitrarily setting the conditions of the etching process or the blast process when forming the uneven pattern.

By the substrate 241 rotating centering on the rotational axis O, the rotary diffusion device 240 in the present embodiment emits the diffusion light of the illumination light WL from each of the areas 311, 312, 313, and 314 in a time-sequential manner.

In the case of the present embodiment, since the areas 311, 312, 313, and 314 are respectively provided with the uneven surfaces 321, 322, 323, and 324 formed of the uneven patterns different in random nature from each other, the speckle pattern of the illumination light WL emitted from the areas 311, 312, 313, and 314 temporally changes.

As described above, according to the rotary diffusion device 240 in the present embodiment, it is possible to emit the illumination light WL including the speckle patterns different from each other respectively from the first area 311, the second area 312, the third area 313, and the fourth area 314 of the diffusing surface 241*a* of the substrate 241. Thus, the speckle pattern of the illumination light WL is temporally averaged, and it is possible to reduce the speckle noise due to the illumination light WL.

Therefore, according to the illumination device using the rotary diffusion device 240 related to the present embodiment, and the projector using this illumination device, it is possible to display an image reduced in speckle noise and good in quality.

Fourth Embodiment

Then, a fourth embodiment of the present disclosure will be described. The present embodiment and the first embodiment are different in configuration of the diffusing surface of the rotary diffusion device, and the rest of the configuration is common to the present embodiment and the first embodiment. Therefore, the configuration of the diffusing surface of the rotary diffusion device will hereinafter be described, and the description of the rest of the configuration will be omitted. Further, the members and the elements common to the first embodiment will be denoted by the same reference symbols, and the description of the details will be omitted.

Figure 6:
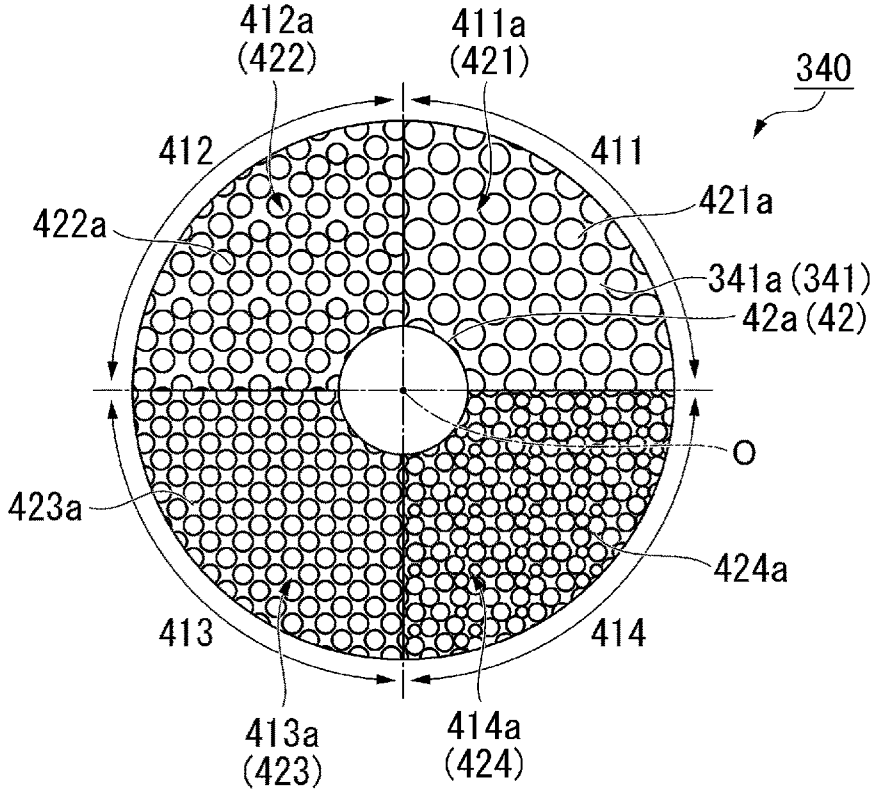
FIG. 6 is a plan view showing a configuration of a related part of a rotary diffusion device in a fourth embodiment.

FIG. 6 is a plan view showing a configuration of a related part of a rotary diffusion device 340 in the present embodiment. FIG. 6 is a diagram as a plan view of a substrate 341 of the rotary diffusion device 340 from the direction along the rotational axis O.

As shown in FIG. 6, in the rotary diffusion device 340 in the present embodiment, a diffusing surface 341*a* of the substrate 341 includes a first area 411 where a first uneven structure 411*a* is disposed, a second area 412 where a second uneven structure 412*a* is disposed, a third area 413 where a third uneven structure 413*a* is disposed, and a fourth area 414 where a fourth uneven structure 414*a* is disposed.

In the present embodiment, the first uneven structure 411*a* is formed of a first lens array surface 421 including a plurality of first small lens surfaces 421*a*. On the first lens array surface 421, the plurality of first small lens surfaces 421*a* is the same in pitch and curvature radius as each other. In other words, the first uneven structure 411*a* has a homogenous uneven pattern.

The third uneven structure 413*a* is formed of a third lens array surface 423 including a plurality of third small lens surfaces 423*a*. On the third lens array surface 423, the plurality of third small lens surfaces 423*a* is the same in pitch and curvature radius as each other. In other words, the third uneven structure 413*a* has a homogenous uneven pattern.

The first small lens surfaces 421*a* and the third small lens surfaces 423*a* are different in at least one of pitch and curvature radius from each other. In the case of the present embodiment, the first small lens surfaces 421*a* and the third small lens surfaces 423*a* are different in both of pitch and curvature radius from each other. In other words, in the present embodiment, the first area 411 and the third area 413 have respective uneven patterns different from each other.

The second uneven structure 412*a* is formed of a second lens array surface 422 including a plurality of second small lens surfaces 422*a*. The second lens array surface 422 is a surface having a random nature in which the second small lens surfaces 422*a* are made different in at least one of pitch and curvature radius from each other. In other words, the second lens array surface 422 is formed of a random uneven pattern in which concave portions and convex portions are irregularly arranged.

The fourth uneven structure 414*a* is formed of a fourth lens array surface 424 including a plurality of fourth small lens surfaces 424*a*. The fourth lens array surface 424 is a surface having a random nature in which the fourth small lens surfaces 424*a* are made different in at least one of pitch and curvature radius from each other. In other words, the fourth lens array surface 424 is formed of a random uneven pattern in which concave portions and convex portions are irregularly arranged.

In the present embodiment, the second small lens surfaces 422*a* of the second lens array surface 422 and the fourth small lens surfaces 424*a* of the fourth lens array surface 424 are different in at least one of pitch and curvature radius from each other.

In other words, in the present embodiment, the second uneven structure 412*a* and the fourth uneven structure 414*a* are respectively formed of the uneven patterns different in random nature from each other.

By the substrate 341 rotating centering on the rotational axis O, the rotary diffusion device 340 in the present embodiment emits the diffusion light of the illumination light WL from each of the areas 411, 412, 413, and 414 in a time-sequential manner.

Here, when taking the first area 411 and the third area 413 as a simple body, since the areas 411, 413 both have the homogenous uneven patterns, the diffusion light of the illumination light WL emitted from each of the areas 411, 413 includes a diffraction pattern.

In the case of the present embodiment, since the areas 411, 413 are different in uneven pattern from each other, the diffraction patterns included in the illumination light WL respectively emitted from the areas 411, 413 are also different from each other. In other words, the speckle pattern of the diffusion light of the illumination light WL emitted respectively from the areas 411, 413 temporally changes.

Further, since the second area 412 and the fourth area 414 are respectively provided with the uneven structures formed of the uneven patterns different in random nature from each other, the speckle pattern of the diffusion light of the illumination light WL emitted from the areas 412, 414 temporally changes.

As described above, according to the rotary diffusion device 340 the present embodiment, it is possible to emit the illumination light WL including the speckle patterns different from each other respectively from the first area 411, the second area 412, the third area 413, and the fourth area 414 of the diffusing surface 341*a* of the substrate 341. Thus, the speckle pattern of the illumination light WL is temporally averaged, and it is possible to reduce the speckle noise due to the illumination light WL.

Therefore, according to the illumination device using the rotary diffusion device 340 related to the present embodiment, and the projector using this illumination device, it is possible to display an image reduced in speckle noise and good in quality.

Fifth Embodiment

Then, a embodiment of the present fifth disclosure will be described. The present embodiment and the first embodiment are different in configuration of the diffusing surface of the rotary diffusion device, and the rest of the configuration is common to the present embodiment and the first embodiment. Therefore, the configuration of the diffusing surface of the rotary diffusion device will hereinafter be described, and the description of the rest of the configuration will be omitted. Further, the members and the elements common to the first embodiment will be denoted by the same reference symbols, and the description of the details will be omitted.

Figure 7:
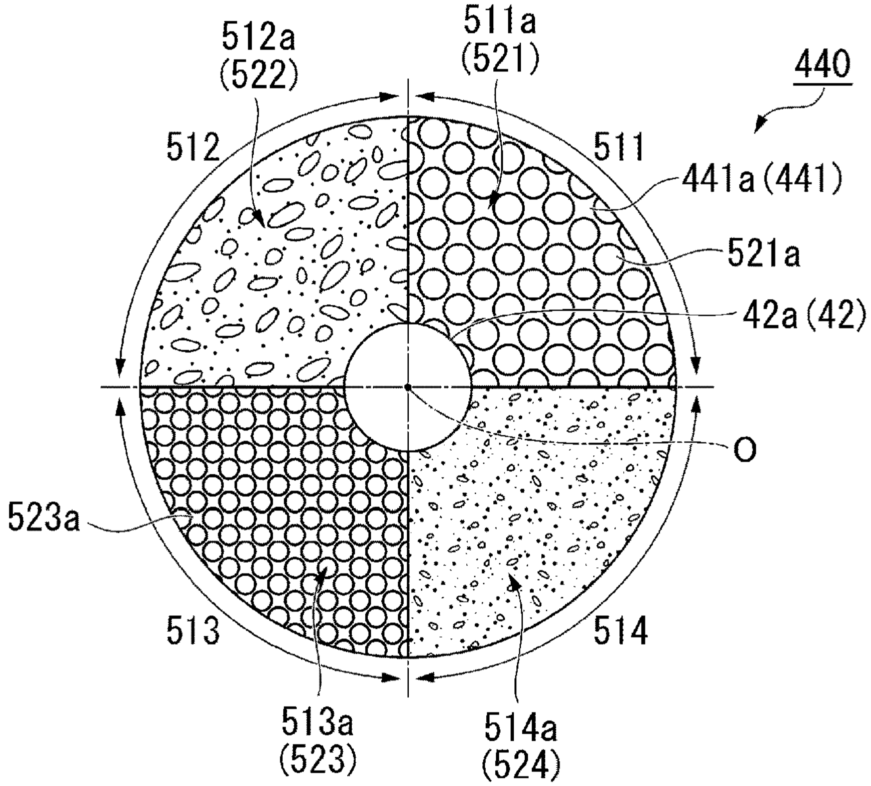
FIG. 7 is a plan view showing a configuration of a related part of a rotary diffusion device in a fifth embodiment.

FIG. 7 is a plan view showing a configuration of a related part of a rotary diffusion device 440 in the present embodiment. FIG. 7 is a diagram as a plan view of a substrate 441 of the rotary diffusion device 440 from the direction along the rotational axis O.

As shown in FIG. 7, in the rotary diffusion device 440 in the present embodiment, a diffusing surface 441*a* of the substrate 441 includes a first area 511 where a first uneven structure 511*a* is disposed, a second area 512 where a second uneven structure 512*a* is disposed, a third area 513 where a third uneven structure 513*a* is disposed, and a fourth area 514 where a fourth uneven structure 514*a* is disposed.

In the present embodiment, the first uneven structure 511*a* is formed of a first lens array surface 521 including a plurality of first small lens surfaces 521*a*. On the first lens array surface 521, the plurality of first small lens surfaces 521*a* is the same in pitch and curvature radius as each other. In other words, the first uneven structure 511*a* has a homogenous uneven pattern.

The third uneven structure 513*a* is formed of a third lens array surface 523 including a plurality of third small lens surfaces 523*a*. On the third lens array surface 523, the plurality of third small lens surfaces 523*a* is the same in pitch and curvature radius as each other. In other words, the third uneven structure 513*a* has a homogenous uneven pattern.

The first small lens surfaces 521*a* and the third small lens surfaces 523*a* are different in at least one of pitch and curvature radius from each other. In the case of the present embodiment, the first small lens surfaces 521*a* and the third small lens surfaces 523*a* are different in both of pitch and curvature radius from each other. In other words, in the present embodiment, the first area 511 and the third area 513 have respective uneven patterns different from each other.

The second uneven structure 512*a* is formed of an uneven surface 522 formed of an uneven pattern having a random nature. The uneven surface 522 is formed using, for example, an etching process or a blast process, and has a random pattern with concave portions and convex portions arranged irregularly.

The fourth uneven structure 514*a* is formed of an uneven surface 524 formed of an uneven pattern having a random nature. The uneven surface 524 is formed using, for example, an etching process or a blast process, and has a random pattern with concave portions and convex portions arranged irregularly.

In the present embodiment, the uneven surface 522 of the second uneven structure 512*a* and the uneven surface 524 of the fourth uneven structure 514*a* are respectively formed of the uneven patterns different in random nature from each other. It should be noted that the random nature of each of the uneven surfaces is controlled by arbitrarily setting the conditions of the etching process or the blast process when forming the uneven pattern.

By the substrate 441 rotating centering on the rotational axis O, the rotary diffusion device 440 in the present embodiment emits the diffusion light of the illumination light WL from each of the areas 511, 512, 513, and 514 in a time-sequential manner.

Here, when taking the first area 511 and the third area 513 as a simple body, since the areas 511, 513 both have the homogenous uneven patterns, the diffusion light of the illumination light WL emitted from each of the areas 511, 513 includes a diffraction pattern.

In the case of the present embodiment, since the areas 511, 513 are different in uneven pattern from each other, the diffraction patterns included in the diffusion light of the illumination light WL respectively emitted from the areas 511, 513 are also different from each other. In other words, the speckle pattern of the diffusion light of the illumination light WL emitted respectively from the areas 511, 513 temporally changes.

Further, since the second area 512 and the fourth area 514 are respectively provided with the uneven structures 512*a*, 514*a* formed of the uneven patterns different in random nature from each other, the speckle pattern of the diffusion light of the illumination light WL emitted from the areas 512, 514 temporally changes.

As described above, according to the rotary diffusion device 440 in the present embodiment, it is possible to emit the illumination light WL including the speckle patterns different from each other respectively from the first area 511, the second area 512, the third area 513, and the fourth area 514 of the diffusing surface 441*a* of the substrate 441. Thus, the speckle pattern of the illumination light WL is temporally averaged, and it is possible to reduce the speckle noise due to the illumination light WL.

Therefore, according to the illumination device using the rotary diffusion device 440 related to the present embodiment, and the projector using this illumination device, it is possible to display an image reduced in speckle noise and good in quality.

Sixth Embodiment

Then, a sixth embodiment of the present disclosure will be described. The present embodiment and the first embodiment are different in configuration of the diffusing surface of the rotary diffusion device, and the rest of the configuration is common to the present embodiment and the first embodiment. Therefore, the configuration of the diffusing surface of the rotary diffusion device will hereinafter be described, and the description of the rest of the configuration will be omitted. Further, the members and the elements common to the first embodiment will be denoted by the same reference symbols, and the description of the details will be omitted.

Figure 8:
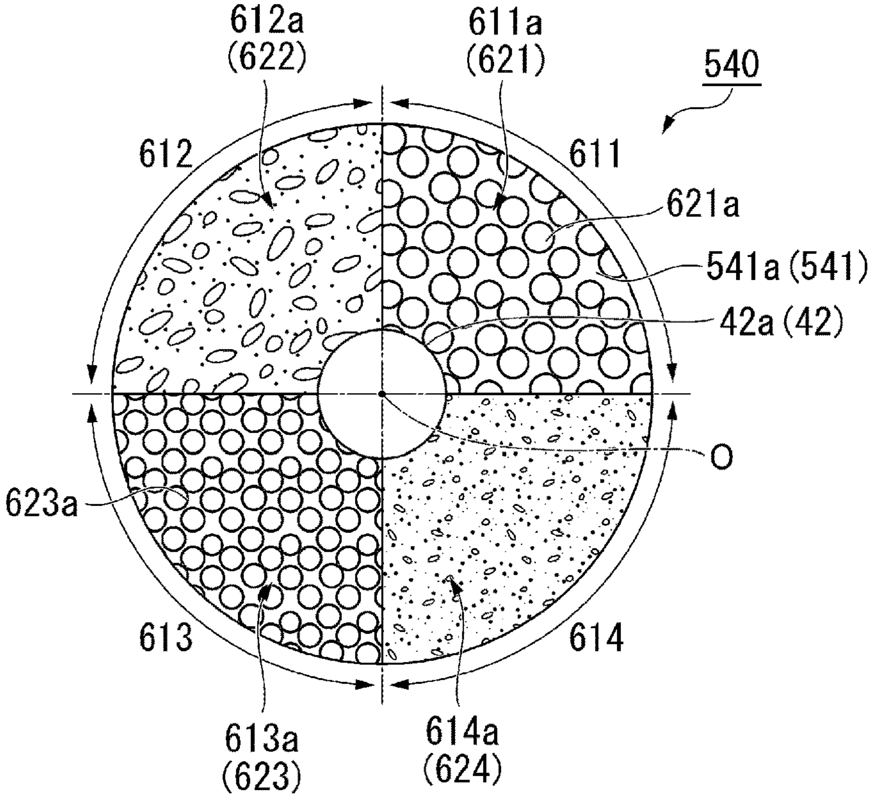
FIG. 8 is a plan view showing a configuration of a related part of a rotary diffusion device in a sixth embodiment.

FIG. 8 is a plan view showing a configuration of a related part of a rotary diffusion device 540 in the present embodiment. FIG. 8 is a diagram as a plan view of a substrate 541 of the rotary diffusion device 540 from the direction along the rotational axis O.

As shown in FIG. 8, in the rotary diffusion device 540 in the present embodiment, a diffusing surface 541*a* of the substrate 541 includes a first area 611 where a first uneven structure 611*a* is disposed, a second area 612 where a second uneven structure 612*a* is disposed, a third area 613 where a third uneven structure 613*a* is disposed, and a fourth area 614 where a fourth uneven structure 614*a* is disposed.

The first uneven structure 611*a* is formed of a first lens array surface 621 including a plurality of first small lens surfaces 621*a*. The first lens array surface 621 is a surface having a random nature in which the first small lens surfaces 621*a* are made different in at least one of pitch and curvature radius from each other. In other words, the first lens array surface 621 is formed of a random uneven pattern in which concave portions and convex portions are irregularly arranged.

The third uneven structure 613*a* is formed of a third lens array surface 623 including a plurality of third small lens surfaces 623*a*. The third lens array surface 623 is a surface having a random nature in which the third small lens surfaces 623*a* are made different in at least one of pitch and curvature radius from each other. In other words, the third lens array surface 623 is formed of a random uneven pattern in which concave portions and convex portions are irregularly arranged.

In the present embodiment, the first small lens surfaces 621*a* of the first lens array surface 621 and the third small lens surfaces 623*a* of the third lens array surface 623 are different in at least one of pitch and curvature radius from each other.

In other words, in the present embodiment, the first uneven structure 611*a* and the third uneven structure 613*a* are respectively formed of the uneven patterns different in random nature from each other.

The second uneven structure 612*a* is formed of an uneven surface 622 formed of an uneven pattern having a random nature. The uneven surface 622 is formed using, for example, an etching process or a blast process, and has a random pattern with concave portions and convex portions arranged irregularly.

The fourth uneven structure 614*a* is formed of an uneven surface 624 formed of an uneven pattern having a random nature. The uneven surface 624 is formed using, for example, an etching process or a blast process, and has a random pattern with concave portions and convex portions arranged irregularly.

In the present embodiment, the uneven surface 622 of the second uneven structure 612*a* and the uneven surface 624 of the fourth uneven structure 614*a* are respectively formed of the uneven patterns different in random nature from each other. It should be noted that the random nature of each of the uneven surfaces is controlled by arbitrarily setting the conditions of the etching process or the blast process when forming the uneven pattern.

By the substrate 441 rotating centering on the rotational axis O, the rotary diffusion device 540 in the present embodiment emits the diffusion light of the illumination light WL from each of the areas 611, 612, 613, and 614 in a time-sequential manner.

In the case of the present embodiment, since the first area 611 and the third area 613 are respectively provided with the lens surfaces 621*a*, 623*a* formed of the uneven patterns different in random nature from each other, the speckle pattern of the illumination light WL emitted from the areas 611, 613 temporally changes. Further, since the second area 612 and the fourth area 614 are respectively provided with the uneven structures 612*a*, 614*a* formed of the uneven patterns different in random nature from each other, the speckle pattern of the diffusion light of the illumination light WL emitted from the areas 612, 614 temporally changes.

As described above, according to the rotary diffusion device 540 in the present embodiment, it is possible to emit the illumination light WL including the speckle patterns different from each other respectively from the first area 611, the second area 612, the third area 613, and the fourth area 614 of the diffusing surface 541*a* of the substrate 541. Thus, the speckle pattern of the illumination light WL is temporally averaged, and it is possible to reduce the speckle noise due to the illumination light WL.

Therefore, according to the illumination device using the rotary diffusion device 540 related to the present embodiment, and the projector using this illumination device, it is possible to display an image reduced in speckle noise and good in quality.

Modified Example

Then, a modified example of the embodiments described above will be described. The present modified example and the embodiments described above are different in configuration of the diffusing surface of the rotary diffusion device, and the rest of the configuration is common to the present modified example and the embodiments described above. Therefore, the configuration of the diffusing surface of the rotary diffusion device will hereinafter be described, and the description of the rest of the configuration will be omitted. Further, the members and the elements common to the first embodiment will be denoted by the same reference symbols, and the description of the details will be omitted.

The modified example of the rotary diffusion device 40 in the first embodiment is hereinafter cited as an example, but substantially the same also applies to the rotary diffusion device in the second through sixth embodiments.

Figure 9:
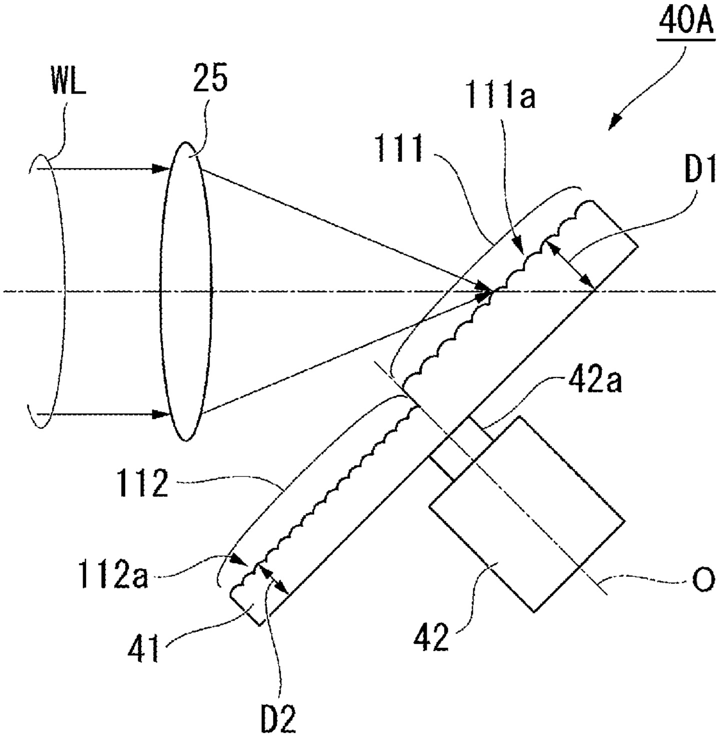
FIG. 9 is a cross-sectional view showing a configuration of a related part of a rotary diffusion device in a modified example.

FIG. 9 is a cross-sectional view showing a configuration of a related part of a rotary diffusion device 40A in the present modified example. FIG. 9 is a cross-sectional view of the rotary diffusion device 40A by a plane including the rotational axis O.

As shown in FIG. 9, in the rotary diffusion device 40A in the present modified example, the thickness of the substrate 41 in a direction along the rotational axis O differs by the area. Specifically, in the substrate 41 of the rotary diffusion device 40A, the thickness D1 in the first area 111 and the thickness D2 in the second area 112 are different from each other. Specifically, the thickness D1 in the first area 111 is thicker than the thickness D2 in the second area 112. Although not shown in FIG. 9, the thickness in the third area and the thickness in the fourth area are different from each other. A magnitude relationship between the thickness in the third area and the thickness in the fourth area does not matter, and is not particularly limited. Further, the thickness in the third area can be equal to the thickness in the first area 111 or the thickness in the second area 112, or can also be different therefrom.

According to the rotary diffusion device 40A in the present modified example, since the thickness D1 in the first area 111 and the thickness D2 in the second area 112 are different from each other, the size of a converging spot of the illumination light WL formed on each of the areas 111, 112 changes. Therefore, compared to the configuration of the first embodiment in which the thickness is made constant in all of the areas, by making the speckle pattern of the diffusion light of the illumination light WL with the areas 111, 112 make a larger change, the speckle noise of the illumination light WL can further be reduced.

Therefore, according to the illumination device using the rotary diffusion device 40A related to the present modified example, and the projector using this illumination device, it is possible to display an image further reduced in speckle noise and good in quality.

It should be noted that the technical scope of the present disclosure is not limited to the embodiments described above, and a variety of modifications can be provided thereto within the scope or the spirit of the present disclosure.

The specific descriptions of the shape, the number, the arrangement, the material, and so on of the constituents of the rotating body device, the illumination device, and the projector described in the above embodiments are not limited to those in the embodiments described above, but can arbitrarily be modified.

For example, there is cited when the diffusing surface of the substrate has the four areas having the respective uneven patterns different from each other as an example in all of the rotary diffusion devices according to the embodiments described above, but the present disclosure is not limited to this example. As long as the diffusing surface includes at least the first area and the second area, it is possible for the diffusing surface to be configured with three areas having respective uneven patterns different from each other, or configured with five or more areas having respective uneven patterns different from each other.

Hereinafter, the conclusion of the present disclosure will supplementarily be noted.

Supplementary Note 1

An illumination device including a first light source configured to emit first light in a first wavelength band, a second light source configured to emit second light in a second wavelength band different from the first wavelength band, a light combining member configured to combine the first light and the second light with each other to emit illumination light, a rotary diffusion device having a substrate including a diffusing surface configured to diffusely reflect the illumination light emitted from the light combining member, and a driver configured to rotate the substrate centering on a rotational axis, a condenser which is disposed between the light combining member and the rotary diffusion device, and which condense the illumination light emitted from the light combining member toward the rotary diffusion device, and a collimator configured to collimate diffusion light of the illumination light emitted from the rotary diffusion device, wherein the diffusing surface of the substrate includes a first area where a first uneven structure is disposed, and a second area where a second uneven structure different from the first uneven structure is disposed.

According to the illumination device having this configuration, since the diffusion light of the illumination light is emitted in a time-sequential manner from the first area and the second area of the diffusing surface of the substrate of the rotary diffusion device, it is possible to temporally change the speckle pattern of the illumination light. Thus, the speckle pattern of the illumination light is temporally averaged, and thus, it is possible to reduce the speckle noise due to the illumination light.

Supplementary Note 2

The illumination device described in Supplementary Note 1, wherein the first uneven structure is formed of a first lens array surface including a plurality of first small lens surfaces which is same in pitch and curvature radius, the second uneven structure is formed of a second lens array surface including a plurality of second small lens surfaces which is same in pitch and curvature radius, and the first small lens surfaces and the second small lens surfaces are different in at least one of pitch and curvature radius from each other.

According to this configuration, it is possible to emit the illumination light including diffraction patterns different from each other from the first area and the second area in a time-sequential manner. Thus, the speckle pattern of the illumination light emitted from the rotary diffusion device is temporally averaged, and thus, it is possible to reduce the speckle noise due to the illumination light.

Supplementary Note 3

The illumination device described in Supplementary Note 1, wherein the first uneven structure is formed of a first lens array surface which includes a plurality of first small lens surfaces, and in which the first small lens surfaces are different in at least one of pitch and curvature radius from each other to have a random nature, and the second uneven structure is formed of a second lens array surface which includes a plurality of second small lens surfaces, and in which the second small lens surfaces are different in at least one of pitch and curvature radius from each other to have a random nature different from the random nature of the first lens array surface.

According to this configuration, it is possible to emit the illumination light including the speckle patterns different from each other from the first area and the second area in a time-sequential manner. Thus, the speckle pattern of the illumination light emitted from the rotary diffusion device is temporally averaged, and thus, it is possible to reduce the speckle noise due to the illumination light.

Supplementary Note 4

The illumination device described in Supplementary Note 1, wherein the first uneven structure is formed of a first uneven surface formed of an uneven pattern having a random nature, and the second uneven structure is formed of a second uneven surface formed of an uneven pattern having a random nature different from the random nature in the first uneven surface.

According to this configuration, it is possible to emit the illumination light including the speckle patterns different from each other from the first area and the second area in a time-sequential manner. Thus, the speckle pattern of the illumination light emitted from the rotary diffusion device is temporally averaged, and thus, it is possible to reduce the speckle noise due to the illumination light.

Supplementary Note 5

The illumination device described in Supplementary Note 1, wherein the first uneven structure is formed of a first lens array surface including a plurality of first small lens surfaces which is same in pitch and curvature radius, and the second uneven structure is formed of a second lens array surface including a plurality of second small lens surfaces which is different in at least one of pitch and curvature radius from each other to have a second random nature.

According to this configuration, it is possible to emit the illumination light including the diffraction pattern from the first area, and at the same time, emit the illumination light which does not include the diffraction pattern from the second area. Thus, it is possible to emit the illumination light including the speckle patterns different from each other from the first area and the second area in a time-sequential manner. Therefore, the speckle pattern of the illumination light emitted from the rotary diffusion device is temporally averaged, and thus, it is possible to reduce the speckle noise due to the illumination light.

Supplementary Note 6

The illumination device described in Supplementary Note 1, wherein the first uneven structure is formed of a first lens array surface including a plurality of first small lens surfaces which is same in pitch and curvature radius, and the second uneven structure is formed of an uneven surface formed of an uneven pattern having a random nature.

According to this configuration, it is possible to emit the illumination light including the diffraction pattern from the first area, and at the same time, emit the illumination light which does not include the diffraction pattern from the second area. Thus, it is possible to emit the illumination light including the speckle patterns different from each other from the first area and the second area in a time-sequential manner. Therefore, the speckle pattern of the illumination light emitted from the rotary diffusion device is temporally averaged, and thus, it is possible to reduce the speckle noise due to the illumination light.

Supplementary Note 7

The illumination device described in Supplementary Note 1, wherein the first uneven structure is formed of a first lens array surface which includes a plurality of first small lens surfaces, and in which the first small lens surfaces are different in at least one of pitch and curvature radius from each other to have a random nature, and the second uneven structure is formed of an uneven surface formed of an uneven pattern having a random nature different from the random nature of the first lens array surface.

According to this configuration, it is possible to emit the illumination light including the speckle patterns different from each other from the first area and the second area in a time-sequential manner. Thus, the speckle pattern of the illumination light emitted from the rotary diffusion device is temporally averaged, and thus, it is possible to reduce the speckle noise due to the illumination light.

Supplementary Note 8

The illumination device described in any one of Supplementary Note 1 through Supplementary Note 7, wherein a thickness in the first area in a direction along the rotational axis and a thickness in the second area in the direction along the rotational axis are different from each other.

According to this configuration, the size of the converging spot formed on each of the first area and the second area changes. Therefore, since the speckle patterns of the diffusion light in the first area and the second area make a larger change, it is possible to further reduce the speckle noise.

Supplementary Note 9

The illumination device described in any one of Supplementary Note 1 through Supplementary Note 8, further including a third light source configured to emit third light in a third wavelength band different from the first wavelength band and the second wavelength band, wherein the light combining member is configured to combine the third light with the first light and the second light to emit the illumination light.

According to this configuration, it is possible to provide an illumination device which reduces the speckle noise of the light obtained by combining the three types of light.

Supplementary Note 10

A projector including the illumination device described in any one of Supplementary Note 1 through Supplementary Note modulator configured to modulate the light from the illumination device, and a projection optical device configured to project the light modulated by the light modulator.

According to the projector having this configuration, since there is provided the illumination device for emitting the illumination light reduced in speckle noise, it is possible to provide the projector which displays an image reduced in speckle noise and good in quality.

What is claimed is:

1. An illumination device comprising:

a first light source configured to emit first light in a first wavelength band;

a second light source configured to emit second light in a second wavelength band different from the first wavelength band;

a light combining member configured to combine the first light and the second light with each other to emit illumination light;

a rotary diffusion device having a substrate including a diffusing surface configured to diffusely reflect the illumination light emitted from the light combining member, and a driver configured to rotate the substrate centering on a rotational axis;

a condenser disposed between the light combining member and the rotary diffusion device, and configured to condense the illumination light emitted from the light combining member toward the rotary diffusion device; and a collimator configured to collimate diffusion light of the illumination light emitted from the rotary diffusion device, wherein the diffusing surface of the substrate includes a first area where a first uneven structure is disposed, and a second area where a second uneven structure different from the first uneven structure is disposed, wherein rotation of the substrate causes the illumination light emitted from the light combining member to enter the first area and the second area in a time-sequential manner, the illumination light including the first light in the first wavelength band and the second light in the second wavelength band.

2. The illumination device according to claim 1, wherein the first uneven structure is formed of a first lens array surface including a plurality of first small lens surfaces of which each pitch is the same and each curvature radius is the same, the second uneven structure is formed of a second lens array surface including a plurality of second small lens surfaces of which each pitch is the same and each curvature radius is the same, and the first small lens surfaces and the second small lens surfaces are different in at least one of pitch and curvature radius from each other.

3. The illumination device according to claim 1, wherein the first uneven structure is formed of a first lens array surface including a plurality of first small lens surfaces and having a first random nature in which at least one of each pitch and each curvature radius of the first small lens surfaces is different from each other, and the second uneven structure is formed of a second lens array surface including a plurality of second small lens surfaces and having a second random nature different from the first random nature in which at least one of each pitch and each curvature radius of the second small lens surfaces is different from each other.

4. The illumination device according to claim 1, wherein the first uneven structure is formed of a first uneven surface formed of an uneven pattern having a first random nature, and the second uneven structure is formed of a second uneven surface formed of an uneven pattern having a second random nature different from the first random nature in the first uneven surface.

5. The illumination device according to claim 1, wherein the first uneven structure is formed of a first lens array surface including a plurality of first small lens surfaces of which each pitch is the same and each curvature radius is the same, and the second uneven structure is formed of a second lens array surface including a plurality of second small lens surfaces and having a random nature in which at least one of each pitch and each curvature radius of the second lens array surface from each other is different from each other.

6. The illumination device according to claim 1, wherein the first uneven structure is formed of a first lens array surface including a plurality of first small lens surfaces of which each pitch is the same and each curvature radius is the same, and the second uneven structure is formed of an uneven surface formed of an uneven pattern having a random nature.

7. The illumination device according to claim 1, wherein the first uneven structure is formed of a first lens array surface including a plurality of first small lens surfaces and having a first random nature in which at least one of each pitch and each curvature radius of the first small lens surfaces is different from each other, and the second uneven structure is formed of an uneven surface formed of an uneven pattern having a second random nature different from the first random nature of the first lens array surface.

8. The illumination device according to claim 1, wherein a thickness in the first area in a direction along the rotational axis and a thickness in the second area in the direction along the rotational axis are different from each other.

9. The illumination device according to claim 1, further comprising:

a third light source configured to emit third light in a third wavelength band different from the first wavelength band and the second wavelength band, wherein the light combining member is configured to combine the third light with the first light and the second light to emit the illumination light.

10. A projector comprising:

the illumination device according to claim 1;

a light modulator configured to modulate the light from the illumination device; and a projection optical device configured to project the light modulated by the light modulator.

* * * * *